United States Patent
Sugiyama et al.

(10) Patent No.: US 10,619,093 B2
(45) Date of Patent: Apr. 14, 2020

(54) PHOTOLUMINESCENT MATERIAL

(71) Applicant: RENGO CO., LTD., Osaka-shi, Osaka (JP)

(72) Inventors: Kouju Sugiyama, Osaka (JP); Kaoru Yamaguchi, Osaka (JP); Shinji Fujiki, Osaka (JP); Minoru Matsukura, Tokyo (JP); Shogo Fujiwara, Tokyo (JP); Fumio Kurosaki, Tokyo (JP); Akio Taniguchi, Nagoya (JP); Junichi Uchita, Nagoya (JP)

(73) Assignee: RENGO CO., LTD., Osaka (JP)

( * ) Notice: Subject to any disclaimer, the term of this patent is extended or adjusted under 35 U.S.C. 154(b) by 378 days.

(21) Appl. No.: 15/574,591

(22) PCT Filed: May 25, 2016

(86) PCT No.: PCT/JP2016/065460
§ 371 (c)(1),
(2) Date: Nov. 16, 2017

(87) PCT Pub. No.: WO2016/190356
PCT Pub. Date: Dec. 1, 2016

(65) Prior Publication Data
US 2018/0148642 A1 May 31, 2018

(30) Foreign Application Priority Data
May 26, 2015 (JP) ................. 2015-106391

(51) Int. Cl.
| C09K 11/64 | (2006.01) |
| F21V 9/30 | (2018.01) |
| C01B 33/26 | (2006.01) |
| C09K 11/08 | (2006.01) |
| C09K 11/58 | (2006.01) |
| G02F 1/13357 | (2006.01) |
| G02F 1/1335 | (2006.01) |

(52) U.S. Cl.
CPC ............ *C09K 11/646* (2013.01); *C01B 33/26* (2013.01); *C01B 33/28* (2013.01); *C09K 11/08* (2013.01); *C09K 11/58* (2013.01); *C09K 11/64* (2013.01); *F21V 9/30* (2018.02); *G02F 1/1336* (2013.01); *G02F 2001/133614* (2013.01)

(58) Field of Classification Search
CPC ..................................................... C09K 11/58
See application file for complete search history.

(56) References Cited

U.S. PATENT DOCUMENTS

| 3,932,592 A | 1/1976 | Todd, Jr. et al. | |
| 4,942,119 A * | 7/1990 | Ozin .................... | B41M 5/124 |
| | | | 423/DIG. 32 |
| 2011/0018425 A1 | 1/2011 | De Cremer et al. | |

FOREIGN PATENT DOCUMENTS

| JP | S50-142482 A | 11/1975 |
| JP | H04-126530 A | 4/1992 |
| JP | 2010-532911 A | 10/2010 |
| JP | 2012-122064 A | 6/2012 |

OTHER PUBLICATIONS

Coutino-Gonzalez et al., "X-ray irradiation-induced formation of luminescent silver clusters in nanoporous matrices," *Chem. Commun.*, 50(11): 1350-1352 (2014).
Kaiheriman et al., "Photoluminescence properties of $Tb^{3+}$-doped sodalite under VUV-UV light excitation," *Journal of Luminescence*, 157: 411-415 (2015).
Maimaitinaisier et al., "Luminescence Properties of Cu Doped Natural Sodalite Under Ultraviolet-Vis Excitation," *Chinese Journal of Luminescence*, 34(12): 1596-1602 (2013).
Stein et al., "Silver Sodalites—A Chemistry Approach Towards Reversible Optical Data Storage," *J. Soc. Photogr. Sci. Technol. Japan*, 53(4): 322-328 (1990).
Todd et al., "U.V. Absorption Band in Ge-Doped Sodalite Powders," *J. Electrochem. Soc.*,127(2): 435-438 (1980).
Japanese Patent Office, International Search Report in International Patent Application No. PCT/JP2016/065460 (dated Aug. 23, 2016).

* cited by examiner

*Primary Examiner* — C Melissa Koslow
(74) *Attorney, Agent, or Firm* — Leydig, Voit & Mayer, Ltd.

(57) ABSTRACT

The present invention provides a photoluminescent material that emits visible light by irradiation of light, which is a sodalite containing a given amount of a silver atom (excluding a sodalite containing an oxalic acid anion) or a sodalite containing given amounts of a silver atom and a zinc atom.

23 Claims, No Drawings

PHOTOLUMINESCENT MATERIAL

CROSS-REFERENCE TO RELATED APPLICATIONS

This patent application is the U.S. national phase of International Patent Application No. PCT/JP2016/065460, filed on May 25, 2016, which claims the benefit of Japanese Patent Application No. 2015-106391, filed on May 26, 2015, the disclosures of which are incorporated herein by reference in their entireties for all purposes.

TECHNICAL FIELD

The present invention relates to a photoluminescent material. Here, the "photoluminescent material" means a "material used for an application utilizing photoluminescence (i.e., phenomenon of visible light emission by light irradiation)".

BACKGROUND ART

A photoluminescent material that emits visible light (generally, light with a wavelength of not less than 380 nm and less than 830 nm) by irradiation of light is used for lighting equipments, back light for liquid crystal display devices and the like. Regarding such photoluminescent material, various techniques have been proposed heretofore.

Patent document 1 describes an emission element containing an assembly of oligo atomic metal clusters confined in molecular sieves. Patent document 1 recites zeolite, porous oxide, silicoaluminophosphate, gallophosphate, zinc phosphate, titanosilicate, and aluminosilicate as molecular sieves. In patent document 1, however, photoluminescence was actually confirmed only in zeolite 3A containing silver cluster (Example 3). In addition, patent document 2 describes a silver-supporting zeolite fluorescent material obtained by a dry treatment under normal pressure at 100° C. or below.

Non-patent document 1 proposes use of a sodalite containing silver and oxalic acid anion as an optical data storage material.

DOCUMENT LIST

Patent Documents patent document 1: JP-A-2010-532911
patent document 2: JP-A-2012-122064

Non-Patent Document non-patent document 1: Andreas STEIN, et al., "Silver Sodalites-A Chemistry Approach Towards Reversible Optical Data Storage", J. Soc. Photogr. Sci. Technol. Japan, Vol. 53, No. 4, 1990

SUMMARY OF THE INVENTION

Problems to be Solved by the Invention

As described in patent documents 1 and 2, it is known that a silver-containing zeolite can be used as a photoluminescent material; however, a photoluminescent material using sodalite rather than zeolite has scarcely been known conventionally. The sodalite described in non-patent document 1, which contains silver and oxalic acid anion, requires use of oxalate, a dangerous material, for the production thereof.

While sodalite is obtained as a by-product of zeolite A, a method for industrially utilizing same is considered to be almost nonexistent. The present invention has been made by taking note of such situation, and aims to provide, a novel photoluminescent material using sodalite.

Means of Solving the Problems

The present inventors have conducted intensive studies and found that a photoluminescent material can be obtained by adding a silver atom to sodalite, without adding oxalic acid anion. Furthermore, they have found that, to impart photoluminescence property to a silver atom-containing sodalite, the temperature of heat treatment needs to be changed and a zinc atom also needs to be added in addition to the silver atom, depending on the content of the silver atom. The present invention based on this finding is as described below.

[1] A photoluminescent material that emits visible light by irradiation of light, which is a sodalite comprising not less than 0.05 wt % and less than 10 wt % of a silver atom (excluding a sodalite containing an oxalic acid anion).

[2] The photoluminescent material of the aforementioned [1], wherein a content of the silver atom is not less than 0.1 wt % and less than 10 wt %.

[3] The photoluminescent material of the aforementioned [1], wherein a content of the silver atom is not less than 0.2 wt % and not more than 9 wt %.

[4] The photoluminescent material of the aforementioned [1], wherein a content of the silver atom is not less than 0.3 wt % and not more than 8 wt %.

[5] The photoluminescent material of any one of the aforementioned [1]-[4], further comprising a zinc atom.

[6] The photoluminescent material of the aforementioned [5], wherein a content of the zinc atom is not less than 0.5 wt % and not more than 25 wt %.

[7] The photoluminescent material of the aforementioned [5], wherein a content of the zinc atom is not less than 1 wt % and not more than 25 wt %.

[8] The photoluminescent material of the aforementioned [5], wherein a content of the zinc atom is not less than 5 wt % and not more than 25 wt %.

[9] The photoluminescent material of any one of the aforementioned [1]-[8], which is produced via a heat treatment at not less than 50° C. and not more than 850° C.

[10] The photoluminescent material of the aforementioned [9], wherein a temperature of the heat treatment is not less than 100° C. and not more than 700° C.

[11] The photoluminescent material of the aforementioned [9], wherein a temperature of the heat treatment is not less than 150° C. and not more than 600° C.

[12] The photoluminescent material of any one of the aforementioned [9]-[11], wherein a heat treatment time is not less than 1 hr and not more than 24 hr.

[13] The photoluminescent material of any one of the aforementioned [9]-[11], wherein a heat treatment time is not less than 2 hr and not more than 24 hr.

[14] The photoluminescent material of any one of the aforementioned [1]-[13], wherein a wavelength of the light to be irradiated is not less than 200 nm and less than 380 nm.

[15] The photoluminescent material of any one of the aforementioned [1]-[13], wherein a wavelength of the light to be irradiated is not less than 220 nm and not more than 370 nm.

[16] The photoluminescent material of any one of the aforementioned [1]-[13], wherein a wavelength of the light to be irradiated is not less than 230 nm and not more than 360 nm.

[17] A photoluminescent material that emits visible light by irradiation of light, which is a sodalite comprising not less than 10 wt % and less than 18 wt % of a silver atom (excluding a sodalite containing an oxalic acid anion), and produced via a heat treatment at less than 300° C.

[18] The photoluminescent material of the aforementioned [17], wherein a content of the silver atom is not less than 10 wt % and not more than 17.8 wt %.

[19] The photoluminescent material of the aforementioned [17], wherein a content of the silver atom is not less than 10 wt % and not more than 17.5 wt %.

[20] The photoluminescent material of the aforementioned [17], wherein a content of the silver atom is not less than 10 wt % and not more than 17 wt %.

[21] The photoluminescent material of any one of the aforementioned [17]-[20], further comprising a zinc atom.

[22] The photoluminescent material of the aforementioned [21], wherein a content of the zinc atom is not less than 0.5 wt % and not more than 21 wt %.

[23] The photoluminescent material of the aforementioned [21], wherein a content of the zinc atom is not less than 1 wt % and not more than 21 wt %.

[24] The photoluminescent material of the aforementioned [21], wherein a content of the zinc atom is not less than 5 wt % and not more than 21 wt %.

[25] The photoluminescent material of any of the aforementioned [17]-[24], wherein a temperature of the heat treatment is not less than 50° C. and less than 300° C.

[26] The photoluminescent material of any of the aforementioned [17]-[24], wherein a temperature of the heat treatment is not less than 100° C. and not more than 270° C.

[27] The photoluminescent material of any of the aforementioned [17]-[24], wherein a temperature of the heat treatment is not less than 150° C. and not more than 250° C.

[28] The photoluminescent material of any one of the aforementioned [17]-[27], wherein a heat treatment time is not less than 1 hr and not more than 24 hr.

[29] The photoluminescent material of any one of the aforementioned [17]-[27], wherein a heat treatment time is not less than 2 hr and not more than 16 hr.

[30] The photoluminescent material of any one of the aforementioned [17]-[29], wherein a wavelength of the light to be irradiated is not less than 200 nm and less than 380 nm.

[31] The photoluminescent material of any one of the aforementioned [17]-[29], wherein a wavelength of the light to be irradiated is not less than 220 nm and not more than 370 nm.

[32] The photoluminescent material of any one of the aforementioned [17]-[29], wherein a wavelength of the light to be irradiated is not less than 230 nm and not more than 360 nm.

[33] A photoluminescent material that emits visible light by irradiation of light, which is a sodalite comprising not less than 18 wt % and less than 31 wt % of a silver atom and not less than 7 wt % and not more than 17 wt % of a zinc atom.

[34] The photoluminescent material of the aforementioned [33], wherein a content of the silver atom is not less than 18.5 wt % and less than 31 wt %.

[35] The photoluminescent material of the aforementioned [33], wherein a content of the silver atom is not less than 19 wt % and less than 31 wt %.

[36] The photoluminescent material of the aforementioned [33], wherein a content of the silver atom is not less than 19.5 wt % and less than 31 wt %.

[37] The photoluminescent material of any one of the aforementioned [33]-[36], wherein a content of the zinc atom is not less than 7.5 wt % and not more than 17 wt %.

[38] The photoluminescent material of any one of the aforementioned [33]-[36], wherein a content of the zinc atom is not less than 8 wt % and not more than 17 wt %.

[39] The photoluminescent material of any one of the aforementioned [33]-[36], wherein a content of the zinc atom is not less than 8.5 wt % and not more than 17 wt %.

[40] The photoluminescent material of any one of the aforementioned [33]-[39], which is produced via a heat treatment at not less than 50° C. and not more than 850° C.

[41] The photoluminescent material of the aforementioned [40], wherein a temperature of the heat treatment is not less than 100° C. and not more than 700° C.

[42] The photoluminescent material of the aforementioned [40], wherein a temperature of the heat treatment is not less than 150° C. and not more than 600° C.

[43] The photoluminescent material of any one of the aforementioned [40]-[42], wherein a heat treatment time is not less than 1 hr and not more than 24 hr.

[44] The photoluminescent material of any one of the aforementioned [40]-[42], wherein a heat treatment time is not less than 2 hr and not more than 24 hr.

[45] The photoluminescent material of any one of the aforementioned [33]-[44], wherein a wavelength of the light to be irradiated is not less than 200 nm and less than 430 nm.

[46] The photoluminescent material of any one of the aforementioned [33]-[44], wherein a wavelength of the light to be irradiated is not less than 220 nm and not more than 420 nm.

[47] The photoluminescent material of any one of the aforementioned [33]-[44], wherein a wavelength of the light to be irradiated is not less than 230 nm and not more than 420 nm.

[48] A photoluminescent material that emits visible light by irradiation of light, which is a sodalite comprising not less than 31 wt % and less than 51 wt % of a silver atom and not less than 0.5 wt % and not more than 11 wt % of a zinc atom, and produced via a heat treatment at not less than 300° C. and not more than 850° C.

[49] The photoluminescent material of the aforementioned [48], wherein a content of the silver atom is not less than 31 wt % and not more than 50.5 wt %.

[50] The photoluminescent material of the aforementioned [48], wherein a content of the silver atom is not less than 31 wt % and not more than 50 wt %.

[51] The photoluminescent material of the aforementioned [48], wherein a content of the silver atom is not less than 31 wt % and not more than 49 wt %.

[52] The photoluminescent material of any one of the aforementioned [48]-[51], wherein a content of the zinc atom is not less than 0.6 wt % and not more than 11 wt %.

[53] The photoluminescent material of any one of the aforementioned [48]-[51], wherein a content of the zinc atom is not less than 0.7 wt % and not more than 11 wt %.

[54] The photoluminescent material of any one of the aforementioned [48]-[51], wherein a content of the zinc atom is not less than 0.8 wt % and not more than 11 wt %.

[55] The photoluminescent material of any of the aforementioned [48]-[54], wherein a temperature of the heat treatment is not less than 300° C. and not more than 700° C.

[56] The photoluminescent material of any of the aforementioned [48]-[54], wherein a temperature of the heat treatment is not less than 350° C. and not more than 650° C.
[57] The photoluminescent material of any of the aforementioned [48]-[54], wherein a temperature of the heat treatment is not less than 400° C. and not more than 600° C.
[58] The photoluminescent material of any one of the aforementioned [48]-[57], wherein a heat treatment time is not less than 1 hr and not more than 12 hr.
[59] The photoluminescent material of any one of the aforementioned [48]-[57], wherein a heat treatment time is not less than 2 hr and not more than 8 hr.
[60] The photoluminescent material of any one of the aforementioned [48]-[59], wherein a wavelength of the light to be irradiated is not less than 200 nm and less than 430 nm.
[61] The photoluminescent material of any one of the aforementioned [48]-[59], wherein a wavelength of the light to be irradiated is not less than 220 nm and not more than 420 nm.
[62] The photoluminescent material of any one of the aforementioned [48]-[59], wherein a wavelength of the light to be irradiated is not less than 230 nm and not more than 420 nm.
[63] The photoluminescent material of any one of the aforementioned [1]-[62], wherein an average particle size of the sodalite is not less than 0.05 μm and not more than 500 μm.
[64] The photoluminescent material of any one of the aforementioned [1]-[62], wherein an average particle size of the sodalite is not less than 0.5 μm and not more than 50 μm.
[65] A lighting equipment comprising a light source and the photoluminescent material of any one of the aforementioned [1]-[64].
[66] The lighting equipment of the aforementioned [65], which is a back light for a liquid crystal display device.
[67] A method of producing a photoluminescent material, comprising producing a sodalite comprising not less than 0.05 wt % and less than 10 wt % of a silver atom (excluding a sodalite containing an oxalic acid anion) by ion exchange, and heat treating the sodalite after the ion exchange at not less than 50° C. and not more than 850° C.
[68] The method of the aforementioned [67], wherein a content of the silver atom in the sodalite after the ion exchange is not less than 0.1 wt % and less than 10 wt %.
[69] The method of the aforementioned [67], wherein a content of the silver atom in the sodalite after the ion exchange is not less than 0.2 wt % and not more than 9 wt %.
[70] The method of the aforementioned [67], wherein a content of the silver atom in the sodalite after the ion exchange is not less than 0.3 wt % and not more than 8 wt %.
[71] The method of any one of the aforementioned [67]-[70], wherein the sodalite after the ion exchange further comprises a zinc atom.
[72] The method of the aforementioned [71], wherein a content of the zinc atom in the sodalite after the ion exchange is not less than 0.5 wt % and not more than 25 wt %.
[73] The method of the aforementioned [71], wherein a content of the zinc atom in the sodalite after the ion exchange is not less than 1 wt % and not more than 25 wt %.
[74] The method of the aforementioned [71], wherein a content of the zinc atom in the sodalite after the ion exchange is not less than 5 wt % and not more than 25 wt %.
[75] The method of any one of the aforementioned [67]-[74], wherein a temperature of the heat treatment is not less than 100° C. and not more than 700° C.
[76] The method of any one of the aforementioned [67]-[74], wherein a temperature of the heat treatment is not less than 150° C. and not more than 600° C.
[77] The method of any one of the aforementioned [67]-[76], wherein a heat treatment time is not less than 1 hr and not more than 24 hr.
[78] The method of any one of the aforementioned [67]-[76], wherein a heat treatment time is not less than 2 hr and not more than 24 hr.
[79] A method of producing a photoluminescent material, comprising producing a sodalite comprising not less than 10 wt % and less than 18 wt % of a silver atom (excluding a sodalite containing an oxalic acid anion) by ion exchange, and heat treating the sodalite after the ion exchange at less than 300° C.
[80] The method of the aforementioned [79], wherein a content of the silver atom in the sodalite after the ion exchange is not less than 10 wt % and not more than 17.8 wt %.
[81] The method of the aforementioned [79], wherein a content of the silver atom in the sodalite after the ion exchange is not less than 10 wt % and not more than 17.5 wt %.
[82] The method of the aforementioned [79], wherein a content of the silver atom in the sodalite after the ion exchange is not less than 10 wt % and not more than 17 wt %.
[83] The method of any one of the aforementioned [79]-[82], wherein the sodalite after the ion exchange further comprises a zinc atom.
[84] The method of the aforementioned [83], wherein a content of the zinc atom in the sodalite after the ion exchange is not less than 0.5 wt % and not more than 21 wt %.
[85] The method of the aforementioned [83], wherein a content of the zinc atom in the sodalite after the ion exchange is not less than 1 wt % and not more than 21 wt %.
[86] The method of the aforementioned [83], wherein a content of the zinc atom in the sodalite after the ion exchange is not less than 5 wt % and not more than 21 wt %.
[87] The method of any one of the aforementioned [79]-[86], wherein a temperature of the heat treatment is not less than 50° C. and less than 300° C.
[88] The method of any one of the aforementioned [79]-[86], wherein a temperature of the heat treatment is not less than 100° C. and not more than 270° C.
[89] The method of any one of the aforementioned [79]-[86], wherein a temperature of the heat treatment is not less than 150° C. and not more than 250° C.
[90] The method of any one of the aforementioned [79]-[89], wherein a heat treatment time is not less than 1 hr to 24 hr.
[91] The method of any one of the aforementioned [79]-[89], wherein a heat treatment time is not less than 2 hr and not more than 16 hr.
[92] A method of producing a photoluminescent material, comprising producing a sodalite comprising not less than 18 wt % and less than 31 wt % of a silver atom and not less than 7 wt % and not more than 17 wt % of a zinc atom by ion exchange, and heat treating the sodalite after the ion exchange at not less than 50° C. and not more than 850° C.

[93] The method of the aforementioned [92], wherein a content of the silver atom in the sodalite after the ion exchange is not less than 18.5 wt % and less than 31 wt %.
[94] The method of the aforementioned [92], wherein a content of the silver atom in the sodalite after the ion exchange is not less than 19 wt % and less than 31 wt %.
[95] The method of the aforementioned [92], wherein a content of the silver atom in the sodalite after the ion exchange is not less than 19.5 wt % and less than 31 wt %.
[96] The method of any one of the aforementioned [92]-[95], wherein a content of the zinc atom in the sodalite after the ion exchange is not less than 7.5 wt % and not more than 17 wt %.
[97] The method of any one of the aforementioned [92]-[95], wherein a content of the zinc atom in the sodalite after the ion exchange is not less than 8 wt % and not more than 17 wt %.
[98] The method of any one of the aforementioned [92]-[95], wherein a content of the zinc atom in the sodalite after the ion exchange is not less than 8.5 wt % and not more than 17 wt %.
[99] The method of any one of the aforementioned [92]-[98], wherein a temperature of the heat treatment is not less than 100° C. and not more than 700° C.
[100] The method of any one of the aforementioned [92]-[98], wherein a temperature of the heat treatment is not less than 150° C. and not more than 600° C.
[101] The method of any one of the aforementioned [92]-[100], wherein a heat treatment time is not less than 1 hr and not more than 24 hr.
[102] The method of any one of the aforementioned [92]-[100], wherein a heat treatment time is not less than 2 hr and not more than 24 hr.
[103] A method of producing a photoluminescent material, comprising producing a sodalite comprising not less than 31 wt % and less than 51 wt % of a silver atom and not less than 0.5 wt % and not more than 11 wt % of a zinc atom by ion exchange, and heat treating the sodalite after the ion exchange at not less than 300° C. and not more than 850° C.
[104] The method of the aforementioned [103], wherein a content of the silver atom in the sodalite after the ion exchange is not less than 31 wt % and not more than 50.5 wt %.
[105] The method of the aforementioned [103], wherein a content of the silver atom in the sodalite after the ion exchange is not less than 31 wt % and not more than 50 wt %.
[106] The method of the aforementioned [103], wherein a content of the silver atom in the sodalite after the ion exchange is not less than 31 wt % and not more than 49 wt %.
[107] The method of any one of the aforementioned [103]-[106], wherein a content of the zinc atom in the sodalite after the ion exchange is not less than 0.6 wt % and not more than 11 wt %.
[108] The method of any one of the aforementioned [103]-[106], wherein a content of the zinc atom in the sodalite after the ion exchange is not less than 0.7 wt % and not more than 11 wt %.
[109] The method of any one of the aforementioned [103]-[106], wherein a content of the zinc atom in the sodalite after the ion exchange is not less than 0.8 wt % and not more than 11 wt %.
[110] The method of any one of the aforementioned [103]-[109], wherein a temperature of the heat treatment is not less than 300° C. and not more than 700° C.
[111] The method of any one of the aforementioned [103]-[109], wherein a temperature of the heat treatment is not less than 350° C. and not more than 650° C.
[112] The method of any one of the aforementioned [103]-[109], wherein a temperature of the heat treatment is not less than 400° C. and not more than 600° C.
[113] The method of any one of the aforementioned [103]-[112], wherein a heat treatment time is not less than 1 hr and not more than 12 hr.
[114] The method of any one of the aforementioned [103]-[112], wherein a heat treatment time is not less than 2 hr and not more than 8 hr.
[115] The method of any one of the aforementioned [67]-[114], wherein an average particle size of the sodalite is not less than 0.05 μm and not more than 500 μm.
[116] The method of any one of the aforementioned [67]-[114], wherein an average particle size of the sodalite is not less than 0.5 μm and not more than 50 μm.

Effect of the Invention

According to the present invention, a photoluminescent material can be obtained using a sodalite, for which an industrial utilization method is conventionally considered to be nonexistent.

DESCRIPTION OF EMBODIMENTS

The photoluminescent material of the present invention is divided into the following four embodiments according to the content of the silver atom. The contents of the silver atom and zinc atom in the photoluminescent material of the present invention are values based on a photoluminescent material (i.e., a silver atom-containing sodalite or a silver atom- and zinc atom-containing sodalite) as a whole.

(1) A sodalite comprising not less than 0.05 wt % and less than 10 wt % of a silver atom (excluding a sodalite containing an oxalic acid anion).

(2) A sodalite containing not less than 10 wt % and less than 18 wt % of a silver atom (excluding a sodalite containing an oxalic acid anion), which is produced via a heat treatment at less than 300° C.

(3) A sodalite containing not less than 18 wt % and less than 31 wt % of a silver atom and not less than 7 wt % and not more than 17 wt % of a zinc atom.

(4) A sodalite containing not less than 31 wt % and less than 51 wt % of a silver atom and not less than 0.5 wt % and not more than 11 wt % of a zinc atom, which is produced via a heat treatment at not less than 300° C. and not more than 850° C.

In the following, the "sodalite of the above-mentioned (1)" is sometimes referred to as "the first photoluminescent material", the "sodalite of the above-mentioned (2)" is sometimes referred to as "the second photoluminescent material", the "sodalite of the above-mentioned (3)" is sometimes referred to as "the third photoluminescent material", and the "sodalite of the above-mentioned (4)" is sometimes referred to as "the fourth photoluminescent material". These first-fourth photoluminescent materials have a common characteristic that they contain a silver atom and are used for application utilizing photoluminescence.

One of the characteristics of the first and second photoluminescent materials is that, different from the sodalite containing silver and oxalic acid anion described in non-patent document 1, they do not contain oxalic acid anion. Due to this characteristic, a dangerous material oxalate is not used in the production of the first and second photoluminescent materials. The third and fourth photoluminescent materials do not require oxalic acid anion and therefore, and there is no need to use a dangerous material oxalate for the production thereof.

The photoluminescent material of the present invention can be produced by performing ion exchange of sodalite and heat treatment of the obtained ion-exchanged sodalite. In the present specification, drying at a temperature higher than room temperature is encompassed in the heat treatment. Sodalite can be easily obtained as a by-product of zeolite A which is currently produced on a large scale at a low cost.

The average particle size of a sodalite as a raw material is preferably not less than 0.05 μm and not more than 500 μm, more preferably not less than 0.5 μm and not more than 50 μm. A preferable range of the average particle size of the photoluminescent material of the present invention obtained from a sodalite (i.e., silver atom-containing sodalite or silver atom- and zinc atom-containing sodalite) is also the same. The average particle size of sodalite as a raw material and the photoluminescent material of the present invention can be measured by laser diffraction and a laser scattering method. For the measurement, for example, a laser diffraction particle size analyzer: "SALD-2100" manufactured by SHIMADZU Corporation and the like can be used.

The ion exchange of sodalite for the production of a photoluminescent material containing a silver atom can be performed by stirring and retaining sodalite in an aqueous solution containing silver ion (e.g., silver nitrate aqueous solution). As shown in the following Examples, the concentration of silver ion in the aqueous solution can be adjusted as appropriate according to the content of the silver atom in the photoluminescent material of the present invention.

The ion exchange of a sodalite for the production of a photoluminescent material containing a silver atom and a zinc atom can be performed by stirring and retaining the sodalite in an aqueous solution containing a silver ion and a zinc ion (e.g., aqueous solution of silver nitrate and zinc sulfate). In addition, the ion exchange may be performed by first stirring and retaining the sodalite in an aqueous zinc ion-containing solution (e.g., an aqueous zinc sulfate solution), and then adding an aqueous silver ion solution (e.g., aqueous silver nitrate solution) to the suspension, and stirring and retaining the mixture. Conversely, the ion exchange may be performed by stirring and retaining the sodalite in an aqueous silver ion solution, and then adding an aqueous zinc ion-containing solution to the suspension, and stirring and retaining the mixture. In addition, the ion exchange may be performed by first stirring and retaining the sodalite in an aqueous zinc ion-containing solution, collecting zinc ion-exchanged sodalite by filtration, and then stirring and retaining the obtained zinc ion-exchanged sodalite in an aqueous silver ion-containing solution. Conversely, the ion exchange may be performed by first stirring and retaining the sodalite in an aqueous silver ion-containing solution, collecting silver ion-exchanged sodalite by filtration, and then stirring and retaining the obtained silver ion-exchanged sodalite in an aqueous zinc ion-containing solution. The concentrations of silver ion and zinc ion in an aqueous solution can be appropriately adjusted according to the contents of the silver atom and zinc atom in the photoluminescent material of the present invention, as shown in the following Examples.

The ion exchange can be performed at room temperature. The period of the ion exchange (i.e., time of stirring and retaining sodalite in aqueous ion-containing solution) is generally not less than 1 hr and not more than 10 hr, preferably not more than 5 hr. The obtained ion-exchanged sodalite is preferably collected from the suspension by filtration and washed with water. In addition, an ion-exchanged sodalite obtained by filtration may be stirred and retained in an aqueous ion-containing solution and the ion exchange treatment may be repeated.

The temperature of the heat treatment of the obtained ion-exchanged sodalite is preferably not less than 50° C. A heat treatment at a temperature less than 50° C. requires a large amount of time for drying the obtained ion-exchanged sodalite, which is not industrially desirable. The upper limit of the heat treatment temperature is preferably 850° C. A heat treatment at a temperature exceeding 850° C. is known to destroy the structure of the sodalite. The heat treatment may be performed in an inert gas (e.g., nitrogen) atmosphere, or may be performed in an air atmosphere.

The second photoluminescent material (content of the silver atom: not less than 10 wt % and less than 18 wt %) needs to be produced via a heat treatment at less than 300° C. On the other hand, the fourth photoluminescent material (content of the silver atom: not less than 31 wt % and less than 51 wt %) needs to be produced via a heat treatment at not less than 300° C. As shown in the below-mentioned Examples and Comparative Examples, when the content of the silver atom is not less than 10 wt % and less than 18 wt %, and the temperature of the heat treatment is not less than 300° C., the obtained silver atom-containing sodalite does not emit visible light. On the other hand, when the content of the silver atom is not less than 31 wt % and less than 51 wt %, and the temperature of the heat treatment is less than 300° C., the obtained silver atom- and zinc atom-containing sodalite does not emit visible light. When the content of the silver atom is not less than 0.05 wt % and less than 10 wt % (the first photoluminescent material) and when the content of the silver atom is not less than 18 wt % and less than 31 wt % (the third photoluminescent material), a photoluminescent material that emits visible light by irradiation of light is obtained by any of a heat treatment at not less than 300° C. and a heat treatment at less than 300° C.

As mentioned above, the difference in the temperature of the heat treatment for producing a photoluminescent material is assumed to be attributable to the fact that the form of the silver atom necessary for emitting light varies in a sodalite due to the difference in the content of the silver atom. The silver atom is assumed to be present in the form of a silver ion in a sodalite obtained by a heat treatment at a low temperature. On the other hand, in a sodalite obtained by a heat treatment at a high temperature, the silver atom is assumed to be present in the form of a silver ion or silver cluster, or a part of the silver atom is assumed to be present in the form of a silver ion and the rest in the form of silver cluster. However, the present invention is not limited by such assumption.

As mentioned above, the form of the silver atom in the sodalite is assumed to vary depending on the temperature of the heat treatment. However, it is virtually impossible or difficult for the current techniques to directly determine the form of the silver atom in a solid photoluminescent material. In the present specification and the claims, therefore, the second and fourth photoluminescent materials are specified by the temperature of the heat treatment as the production condition, in addition to the contents of the silver atom and zinc atom. Also, the first and third photoluminescent materials are sometimes specified by the temperature of the heat treatment as the production condition, in addition to the contents of the silver atom and zinc atom.

The temperature of the heat treatment for producing the first photoluminescent material is preferably not less than 50° C. and not more than 850° C., more preferably not less than 100° C. and not more than 700° C., further preferably not less than 150° C. and not more than 600° C. The heat treatment time for producing the first photoluminescent material is preferably not less than 1 hr and not more than 24 hr, more preferably not less than 2 hr and not more than 24 hr.

The temperature of the heat treatment for producing the second photoluminescent needs to be less than 300° C., preferably not less than 50° C. and less than 300° C., more preferably not less than 100° C. and not more than 270° C., further preferably not less than 150° C. and not more than 250° C. The heat treatment time for producing the second photoluminescent material is preferably not less than 1 hr to 24 hr, more preferably not less than 2 hr and not more than 16 hr.

The temperature of the heat treatment for producing the third photoluminescent is preferably not less than 50° C. and not more than 850° C., more preferably not less than 100° C. and not more than 700° C., further preferably not less than 150° C. and not more than 600° C. The heat treatment time for producing the third photoluminescent material is preferably not less than 1 hr and not more than 24 hr, more preferably not less than 2 hr and not more than 24 hr.

The temperature of the heat treatment for producing the fourth photoluminescent needs to be not less than 300° C. and not more than 850° C., preferably not less than 300° C. and not more than 700° C., more preferably not less than 350° C. and not more than 650° C., further preferably not less than 400° C. and not more than 600° C. The heat treatment time for producing the fourth photoluminescent material is preferably not less than 1 hr and not more than 12 hr, more preferably not less than 2 hr and not more than 8 hr.

Since the photoluminescent material of the present invention obtained after the aforementioned heat treatment can emit visible light by light irradiation even when placed in water, tight sealing and the like for shutting off moisture is not necessary.

The first and second photoluminescent materials having a silver atom content of less than 18 wt % do not require a zinc atom for emitting light. The first and second photoluminescent materials may also contain a zinc atom. On the other hand, the third and fourth photoluminescent materials having a silver atom content of not less than 18 wt % require a zinc atom in addition to the silver atom for emitting light. When the content of the silver atom increases, a zinc atom becomes necessary, which is, as mentioned above, assumed to be attributable to the fact that the form of the silver atom necessary for emitting light varies in a sodalite due to the difference in the content of the silver atom. However, the present invention is not limited by such assumption. The content of the silver atom and zinc atom can be measured by the method described in the following Examples.

The photoluminescent material of the present invention may contain an atom (hereinafter to be referred to as "other atom") and/or an ion (hereinafter to be referred to as "other ion") other than the silver atom and a zinc atom. Examples of other atom include transition metal atoms other than silver and zinc, alkali metal atoms, alkaline earth metal atoms, halogen atoms and the like. Examples of other ion include ammonium ion, halide ion and the like. However, the first and second photoluminescent materials do not contain oxalic acid anion. On the other hand, the third and fourth photoluminescent materials may contain oxalic acid anion.

The content of the silver atom in the first photoluminescent material is not less than 0.05 wt % and less than 10 wt %, preferably not less than 0.1 wt % and less than 10 wt %, more preferably not less than 0.2 wt % and not more than 9 wt %, further preferably not less than 0.3 wt % and not more than 8 wt %. The first photoluminescent material may contain a zinc atom. The content of the zinc atom in the first photoluminescent material atom is preferably not less than 0 wt % and not more than 25 wt %, more preferably not less than 0.5 wt % and not more than 25 wt %, further preferably not less than 1 wt % and not more than 25 wt %, particularly preferably not less than 5 wt % and not more than 25 wt %.

The content of the silver atom in the second photoluminescent material is not less than 10 wt % and less than 18 wt %, preferably not less than 10 wt % and not more than 17.8 wt %, more preferably not less than 10 wt % and not more than 17.5 wt %, further preferably not less than 10 wt % and not more than 17 wt %. The second photoluminescent material may contain a zinc atom. The content of the zinc atom in the second photoluminescent material is preferably not less than 0 wt % and not more than 21 wt %, more preferably not less than 0.5 wt % and not more than 21 wt %, further preferably not less than 1 wt % and not more than 21 wt %, particularly preferably not less than wt % and not more than 21 wt %.

The content of the silver atom in the third photoluminescent material is not less than 18 wt % and less than 31 wt %, preferably not less than 18.5 wt % and less than 31 wt %, more preferably not less than 19 wt % and less than 31 wt %, further preferably not less than 19.5 wt % and less than 31 wt %. The content of the zinc atom in the third photoluminescent material is not less than 7 wt % and not more than 17 wt %, preferably not less than 7.5 wt % and not more than 17 wt %, more preferably not less than 8 wt % and not more than 17 wt %, further preferably not less than 8.5 wt % and not more than 17 wt %. When the content of the silver atom in the silver atom- and zinc atom-containing sodalite is not less than 18 wt %, the content of the zinc atom does not exceed 17 wt %.

The content of the silver atom in the fourth photoluminescent material is not less than 31 wt % and less than 51 wt %, preferably not less than 31 wt % and not more than 50.5 wt %, more preferably not less than 31 wt % and not more than 50 wt %, further preferably not less than 31 wt % and not more than 49 wt %. The content of the zinc atom in the fourth photoluminescent material is not less than 0.5 wt % and not more than 11 wt %, preferably not less than 0.6 wt % and not more than 11 wt %, more preferably not less than 0.7 wt % and not more than 11 wt %, further preferably not less than 0.8 wt % and not more than 11 wt %. When the content of the silver atom in the silver atom- and zinc atom-containing sodalite is not less than 31 wt %, the content of the zinc atom does not exceed 11 wt %.

The wavelength of the light to be irradiated on the first photoluminescent material is preferably not less than 200 nm and less than 380 nm, more preferably not less than 220 nm and not more than 370 nm, further preferably not less than 230 nm and not more than 360 nm.

The wavelength of the light to be irradiated on the second photoluminescent material is preferably not less than 200 nm and less than 380 nm, more preferably not less than 220 nm and not more than 370 nm, further preferably not less than 230 nm and not more than 360 nm.

The wavelength of the light to be irradiated on the third photoluminescent material is preferably not less than 200 nm and less than 430 nm, more preferably not less than 220 nm and not more than 420 nm, further preferably not less than 230 nm and not more than 420 nm.

The wavelength of the light to be irradiated on the fourth photoluminescent material is preferably not less than 200 nm and less than 430 nm, more preferably not less than 220 nm and not more than 420 nm, further preferably not less than 230 nm and not more than 420 nm.

As shown in the following Examples, the third and fourth photoluminescent materials can emit visible light even when light in the visible light region having a wavelength of not less than 380 nm is irradiated rather than light in the ultraviolet light region having a wavelength of less than 380 nm.

The photoluminescent material of the present invention can be used, for example, in lighting equipments. Moreover, the photoluminescent material of the present invention can be used, for example, in a luminescent paint for forgery prevention of paper money, voucher, card and the like. Particularly the photoluminescent material of the present invention is useful as a material for a luminescent paint to be used for paper money and the like exposed to various environments, since it exhibits photoluminescence even under conditions where water is present. In these uses, the photoluminescent material of the present invention to be used may be of one kind or two or more kinds in combination. Also, the photoluminescent material of the present invention may be used in combination with other photoluminescent material.

The present invention also provides a lighting equipment containing a light source and the photoluminescent material of the present invention. In the lighting equipment of the present invention, known light sources, for example, a mercury lamp and an LED can be used. As the light source, LED is preferable since it shows high energy efficiency and does not use mercury that causes environmental contamination. The lighting equipment of the present invention can be used as lights for daily living such as fluorescent lamp, back light for a liquid crystal display device and the like.

The method of use of a photoluminescent material in a lighting equipment is not particularly limited. For example, a light source may be covered with glass, and the photoluminescent material may be fixed on the inside or outside the glass with a binder (for example, transparent epoxy resin). Moreover, a light source may be covered with glass kneaded with the photoluminescent material of the present invention. Furthermore, a lighting equipment emitting a subdued light such as that of an oil lampstand with a wood frame and paper shade can be produced by covering a light source with paper kneaded with the photoluminescent material of the present invention.

EXAMPLES

The present invention is explained in more detail in the following by referring to Examples, which are not to be construed as limitative. It is possible to modify and practice the invention as long as it does not deviate from the above-mentioned and the following descriptions, and all such embodiments are encompassed in the technical scope of the present invention.

<Sodalite>

In the following Examples and Comparative Examples, sodalites having the following properties manufactured by Tosoh Corporation were used.

average particle size: about 1 μm
containing $Na^+$ ion as ion exchangeable cation
ion exchange capacity: about 8.3 meq/g <Measurement of Content of Silver Atom and Zinc Atom>

The contents of the silver atom in the silver atom-containing sodalite and the contents of the silver atom and zinc atom in the silver atom- and zinc atom-containing sodalite, which were obtained in the following Examples and Comparative Examples were measured by energy dispersive X-ray analysis (EDS, acceleration voltage 15 kV) using "JSM-6010PLUS/LA" manufactured by JEOL Ltd. The results are shown in the following Tables.

<Observation of Photoluminescence>

On a silver atom-containing sodalite or a silver atom- and zinc atom-containing sodalite, obtained in the following Examples and Comparative Examples, was irradiated ultraviolet light having a wavelength of 254 nm, 302 nm or 365 nm by using "VL-4LC" manufactured by VILBER LOURMAT, or visible light having a wavelength of 405 nm by using "12 UV-LEDs" obtained from KIREIDO, and emission intensity and luminescent color were visually observed. The results are shown in the following Tables.

(1) Sodalite Comprising not Less than 0.05 wt % and Less than 10 Wt % of a Silver Atom Example 1 (Production of Silver Atom-Containing Sodalite)

An ion exchange treatment of a sodalite (5 g) was performed by stirring and retaining in an aqueous silver nitrate solution (1000 mL, silver ion concentration 0.41 mmol/L) at room temperature for 1 hr. Then, the sodalite was collected by filtration from the suspension, and washed with water to give a silver ion-exchanged sodalite in a wet condition. The obtained silver ion-exchanged sodalite was subjected to a heat treatment under air atmosphere at 500° C. for 4 hr to give a silver atom-containing sodalite.

Example 2 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 5.2 mmol/L, zinc ion concentration 23.3 mmol/L) at room temperature for 1 hr. Then, the sodalite was collected by filtration from the suspension, and washed with water to give a silver ion- and zinc ion-exchanged sodalite in a wet condition. The obtained silver ion and zinc ion-exchanged sodalite was subjected to a heat treatment under air atmosphere at 50° C. for 16 hr to give a silver atom- and zinc atom-containing sodalite.

TABLE 1

|  | Example 1 | Example 2 |
|---|---|---|
| heat treatment temperature (° C.) | 500 | 50 |
| heat treatment time (hr) | 4 | 16 |
| content of silver atom (wt %) | 2.0 | 9.9 |
| content of zinc atom (wt %) | 0 | 11.1 |
| wavelength (nm) of irradiated light | 302 | 302 |
| emission intensity | strong | rather weak |
| luminescent color | light blue | light orange |

As shown in Table 1, the sodalites of Examples 1 and 2 containing not less than 0.05 wt % and less than 10 wt % of a silver atom, which were produced via a heat treatment at not less than 300° C. or less than 300° C., emitted visible light by the irradiation of light. The sodalites of these embodiments emitted visible light by the irradiation of light irrespective of the presence or absence of a zinc atom.

(2) Sodalite Comprising not Less than 10 wt % and Less than 18 Wt % of a Silver Atom Example 3 (Production of Silver Atom-Containing Sodalite)

An ion exchange treatment of a sodalite (5 g) was performed by stirring and retaining in an aqueous silver nitrate solution (1000 mL, silver ion concentration 2.1 mmol/L) at room temperature for 1 hr. Then, the sodalite was collected by filtration from the suspension, and washed with water to give a silver ion-exchanged sodalite in a wet condition. The obtained silver ion-exchanged sodalite was subjected to a heat treatment under air atmosphere at 230° C. for 6 hr to give a silver atom-containing sodalite.

Comparative Example 1 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 5.2 mmol/L, zinc ion concentration 23.3 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 500° C. for 4 hr to give a silver atom- and zinc atom-containing sodalite.

TABLE 2

| | Example 3 | Comparative Example 1 |
|---|---|---|
| heat treatment temperature (° C.) | 230 | 500 |
| heat treatment time (time) | 6 | 4 |
| content of silver atom (wt %) | 16.6 | 10.7 |
| content of zinc atom (wt %) | 0 | 10.0 |
| wavelength (nm) of irradiated light | 302 | no luminescence*[1] |
| emission intensity | strong | |
| luminescent color | yellow-green | |

*[1]The sodalite of Comparative Example 1 did not emit light by irradiation of ultraviolet light having a wavelength of 254 nm, 302 nm or 365 nm, or visible light having a wavelength of 405 nm.

As shown in Table 2, when the content of the silver atom is not less than 10 wt % and less than 18 wt %, the silver atom-containing sodalite of Example 3 produced via a heat treatment at less than 300° C. emitted visible light by the irradiation of light, whereas the silver atom- and zinc atom-containing sodalite of Comparative Example 1 produced via a heat treatment at not less than 300° C. did not emit light.

(3) Sodalite Containing not Less than 18 wt % and Less than 31 Wt % of a Silver Atom Example 4 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 10.3 mmol/L, zinc ion concentration 20.7 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 230° C. for 6 hr to give a silver atom- and zinc atom-containing sodalite.

Example 5 (Production of Silver Atom- and Zinc Atom-Containing Sodalite)

An ion exchange treatment of a sodalite (5 g) was performed by first stirring and retaining in an aqueous solution of zinc sulfate (1000 mL, zinc ion concentration 103.3 mmol/L) at room temperature for 1 hr, adding a high concentration of an aqueous solution of silver nitrate (10 mL, silver ion concentration 2.49 mol/L), adjusting the silver ion concentration of the aqueous solution after addition to 24.7 mmol/L, and further stirring and retaining the mixture at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 50° C. for 16 hr to give a silver atom- and zinc atom-containing sodalite.

Example 6 (Production of Silver Atom- and Zinc Atom-Containing Sodalite)

An ion exchange treatment of a sodalite (5 g) was performed by stirring and retaining in an aqueous solution of zinc sulfate (1000 mL, zinc ion concentration 20.6 mmol/L) at 40° C. for 1 hr. The sodalite was collected by filtration from the suspension, and washed with water to give a zinc ion-exchanged sodalite in a wet condition. A similar zinc ion exchange operation of the total amount of the obtained zinc ion-exchanged sodalite was repeated two more times to give a zinc ion-exchanged sodalite. An ion exchange treatment of the total amount of the zinc ion-exchanged sodalite was performed by stirring and retaining in an aqueous solution of silver nitrate (1000 mL, silver ion concentration 25.8 mmol/L) at room temperature for 1 hr, and the sodalite was collected by filtration from the suspension and washed with water to give a silver ion and zinc ion-exchanged sodalite in a wet condition. The obtained silver ion and zinc ion-exchanged sodalite was subjected to a heat treatment under air atmosphere at 400° C. for 4 hr to give a silver atom- and zinc atom-containing sodalite.

Comparative Example 2 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 15.5 mmol/L, zinc ion concentration 18.1 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 230° C. for 6 hr to give a silver atom- and zinc atom-containing sodalite.

TABLE 3

|  | | Example 4 | Example 5 | | Example 6 | | Comparative Example 2 |
|---|---|---|---|---|---|---|---|
| heat treatment | temperature (° C.) | 230 | 50 | | 400 | | 230 |
| | time (time) | 6 | 16 | | 4 | | 6 |
| content of silver atom (wt %) | | 18.3 | 30.3 | | 28.7 | | 28.2 |
| content of zinc atom (wt %) | | 8.1 | 9.2 | | 12.4 | | 5.6 |
| wavelength (nm) of irradiated light | | 365 | 365 | 405 | 302 | 405 | no lumi- |
| emmission intensity | | rather weak | rather weak | rather weak | strong | strong | nescence*[1] |
| luminescent color | | light orange | light red | red-purple | yellow-white | white-purple | |

*[1]The sodalite of Comparative Example 2 did not emit light by irradiation of ultraviolet light having a wavelength of 254 nm, 302 nm or 365 nm, or visible light having a wavelength of 405 nm.

As shown in Table 3, when the content of the silver atom was not less than 18 wt % and less than 31 wt %, the silver atom- and zinc atom-containing sodalite of Comparative Example 2 having a zinc atom content of less than 7 wt % did not emit visible light by irradiation of light. However, the sodalites containing a silver atom and a zinc atom of Examples 4-6 containing not less than 7 wt % to 17 wt % of a zinc atom emitted visible light. In this embodiment, both the sodalites containing a silver atom and a zinc atom of Examples 4 and 5 produced via a heat treatment at less than 300° C., and the silver atom- and zinc atom-containing sodalite of Example 6 produced via a heat treatment at not less than 300° C. emitted visible light by irradiation of light.

(4) Sodalite Containing not Less than 31 wt % and Less than 51 Wt % of a Silver Atom Example 7 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 20.6 mmol/L, zinc ion concentration 15.5 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 500° C. for 4 hr to give a silver atom- and zinc atom-containing sodalite.

Example 8 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 36.1 mmol/L, zinc ion concentration 7.8 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 500° C. for 4 hr to give a silver atom- and zinc atom-containing sodalite.

Comparative Example 3 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 46.4 mmol/L, zinc ion concentration 3.9 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 500° C. for 4 hr to give a silver atom- and zinc atom-containing sodalite.

Comparative Example 4 (Production of Silver Atom- and Zinc Atom-Containing Sodalite)

An ion exchange treatment of a sodalite (5 g) was performed by stirring and retaining in an aqueous solution of silver nitrate and zinc sulfate (1000 mL, silver ion concentration 20.6 mmol/L, zinc ion concentration 15.5 mmol/L) at room temperature for 1 hr. Then, the sodalite was collected by filtration from the suspension, and washed with water to give a silver ion and zinc ion-exchanged sodalite in a wet condition. The obtained silver ion and zinc ion-exchanged sodalite was subjected to a heat treatment under air atmosphere at 230° C. for 6 hr to give a silver atom- and zinc atom-containing sodalite.

TABLE 4

| | | Example 7 | | Example 8 | | Comparative Example 3 | Comparative Example 4 |
|---|---|---|---|---|---|---|---|
| heat treatment | temperature (° C.) | 500 | | 500 | | 500 | 230 |
| | time (time) | 4 | | 4 | | 4 | 6 |
| content of silver atom (wt %) | | 33.2 | | 48.6 | | 52.9 | 35.8 |
| content of zinc atom (wt %) | | 4.0 | | 1.3 | | 0.3 | 4.1 |
| wavelength (nm) of irradiated light | | 302 | 405 | 365 | 405 | no lumi- | no lumi- |
| emission intensity | | strong | strong | rather weak | rather weak | nescence*[1] | nescence*[1] |
| luminescent color | | orange | red-purple | dark-red | red-purple | | |

*[1]The sodalites of Comparative Examples 3 and 4 did not emit light by irradiation of ultraviolet light having a wavelength of 254 nm, 302 nm or 365 nm, or visible light having a wavelength of 405 nm.

As shown in Table 4, when the content of the silver atom was not less than 31 wt % and less than 51 wt %, and the content of the zinc atom is not less than 0.5 wt % and not more than 11 wt %, the silver atom- and zinc atom-containing sodalite of Comparative Example 4 produced via a heat treatment at less than 300° C. did not emit visible light by irradiation of light. The sodalites containing a silver atom and a zinc atom of Examples 7 and 8 produced via a heat treatment at not less than 300° C. emitted visible light. In addition, the silver atom- and zinc atom-containing sodalite of Comparative Example 3, having a silver atom content exceeding 51 wt % and a zinc atom content of less than 0.5 wt % did not emit visible light by irradiation of light, even though it was produced via a heat treatment at not less than 300° C.

INDUSTRIAL APPLICABILITY

The photoluminescent material of the present invention (i.e., a silver atom-containing sodalite or a silver atom- and zinc atom-containing sodalite) can be used in a luminescent paint for forgery prevention of paper money and the like, and a lighting equipment.

This application is based on a patent application No. 2015-106391 filed in Japan, the contents of which are incorporated in full herein.

The invention claimed is:

1. A photoluminescent material that emits visible light by irradiation of light, which is a sodalite comprising not less than 0.05 wt % and less than 10 wt % of a silver atom (excluding a sodalite containing an oxalic acid anion).

2. The photoluminescent material according to claim 1, which is produced via a heat treatment at not less than 50° C. and not more than 850° C.

3. The photoluminescent material according to claim 1, wherein a wavelength of the light to be irradiated is not less than 200 nm and less than 380 nm.

4. A photoluminescent material that emits visible light by irradiation of light, which is a sodalite comprising not less than 10 wt % and less than 18 wt % of a silver atom (excluding a sodalite containing an oxalic acid anion), and produced via a heat treatment at less than 300° C.

5. The photoluminescent material according to claim 4, wherein a temperature of the heat treatment is not less than 50° C. and less than 300° C.

6. The photoluminescent material according to claim 4, wherein a wavelength of the light to be irradiated is not less than 200 nm and less than 380 nm.

7. A photoluminescent material that emits visible light by irradiation of light, which is a sodalite comprising not less than 18 wt % and less than 31 wt % of a silver atom and not less than 7 wt % and not more than 17 wt % of a zinc atom.

8. The photoluminescent material according to claim 7, which is produced via a heat treatment at not less than 50° C. and not more than 850° C.

9. The photoluminescent material according to claim 7, wherein a wavelength of the light to be irradiated is not less than 200 nm and less than 430 nm.

10. A photoluminescent material that emits visible light by irradiation of light, which is a sodalite comprising not less than 31 wt % and less than 51 wt % of a silver atom and not less than 0.5 wt % and not more than 11 wt % of a zinc atom, and produced via a heat treatment at not less than 300° C. and not more than 850° C.

11. The photoluminescent material according to claim 10, wherein a wavelength of the light to be irradiated is not less than 200 nm and less than 430 nm.

12. A method of producing a photoluminescent material, comprising producing a sodalite comprising not less than 0.05 wt % and less than 10 wt % of a silver atom (excluding a sodalite containing an oxalic acid anion) by ion exchange, and heat treating the sodalite after the ion exchange at not less than 50° C. and not more than 850° C.

13. A method of producing a photoluminescent material, comprising producing a sodalite comprising not less than 10 wt % and less than 18 wt % of a silver atom (excluding a sodalite containing an oxalic acid anion) by ion exchange, and heat treating the sodalite after the ion exchange at less than 300° C.

14. A method of producing a photoluminescent material, comprising producing a sodalite comprising not less than 18 wt % and less than 31 wt % of a silver atom and not less than 7 wt % and not more than 17 wt % of a zinc atom by ion exchange, and heat treating the sodalite after the ion exchange at not less than 50° C. and not more than 850° C.

15. A method of producing a photoluminescent material, comprising producing a sodalite comprising not less than 31 wt % and less than 51 wt % of a silver atom and not less than 0.5 wt % and not more than 11 wt % of a zinc atom by ion exchange, and heat treating the sodalite after the ion exchange at not less than 300° C. and not more than 850° C.

16. A lighting equipment comprising a light source and the photoluminescent material according to claim 4.

17. A lighting equipment comprising a light source and the photoluminescent material according to claim 1.

18. The lighting equipment according to claim 17, which is a back light for a liquid crystal display device.

19. The lighting equipment according to claim 16, which is a back light for a liquid crystal display device.

20. A lighting equipment comprising a light source and the photoluminescent material according to claim 7.

21. The lighting equipment according to claim 20, which is a back light for a liquid crystal display device.

22. A lighting equipment comprising a light source and the photoluminescent material according to claim 10.

23. The lighting equipment according to claim 22, which is a back light for a liquid crystal display device.

* * * * *